(«12») United States Patent
Yamashita et al.

(10) Patent No.: US 11,332,357 B2
(45) Date of Patent: May 17, 2022

(54) LIQUID QUALITY CONTROL DEVICE

(71) Applicants: Asahi Group Holdings, Ltd., Tokyo (JP); ASAHI BREWERIES, LTD., Tokyo (JP)

(72) Inventors: Naoyuki Yamashita, Kashiwa (JP); Junichi Kitano, Kawaguchi (JP); Takashi Wada, Kobe (JP); Kenji Kusunoki, Kobe (JP)

(73) Assignees: ASAHI GROUP HOLDINGS, LTD., Tokyo (JP); ASAHI BREWERIES, LTD., Tokyo (JP)

( * ) Notice: Subject to any disclaimer, the term of this patent is extended or adjusted under 35 U.S.C. 154(b) by 23 days.

(21) Appl. No.: 16/771,386

(22) PCT Filed: Nov. 16, 2018

(86) PCT No.: PCT/JP2018/042450
§ 371 (c)(1),
(2) Date: Jun. 10, 2020

(87) PCT Pub. No.: WO2019/116822
PCT Pub. Date: Jun. 20, 2019

(65) Prior Publication Data
US 2020/0391990 A1    Dec. 17, 2020

(30) Foreign Application Priority Data
Dec. 11, 2017    (JP) .............................. JP2017-236783

(51) Int. Cl.
*B67D 1/12* (2006.01)
*B67D 1/14* (2006.01)
*G01F 15/075* (2006.01)

(52) U.S. Cl.
CPC .............. *B67D 1/1211* (2013.01); *B67D 1/14* (2013.01); *G01F 15/075* (2013.01)

(58) Field of Classification Search
CPC .. B67D 1/1211; B67D 1/1213; B67D 1/1218; B67D 1/122; B67D 1/14; B67D 1/1405;
(Continued)

(56) References Cited

U.S. PATENT DOCUMENTS 4,969,576 A * 11/1990 Merrill ................. B67D 1/0857
222/1
4,979,641 A * 12/1990 Turner ................. B67D 1/0855
222/153.03

(Continued)

FOREIGN PATENT DOCUMENTS

| CA | 2 592 076 | 12/2008 |
|---|---|---|
| CN | 2 592 076 | 12/2008 |

(Continued)

OTHER PUBLICATIONS

International Search Report dated Feb. 19, 2019 in International (PCT) Application No. PCT/JP2018/042450.
(Continued)

*Primary Examiner* — J C Jacyna
(74) *Attorney, Agent, or Firm* — Wenderoth, Lind & Ponack, L.L.P.

(57) ABSTRACT

A liquid quality management device capable of being added to a liquid supply system which can supply a liquid within a storage container to a dispensing device in order to cool the liquid, and can dispense the liquid to a drinking container. The liquid quality management device includes an actual flow rate preparation unit including a flow rate sensor for determining an actual measured flow rate of the liquid; a dispensing liquid temperature sensor for measuring a temperature of the liquid dispensed into the drinking container; and a determination unit electrically connected to the actual flow rate preparation unit and the dispensing liquid temperature sensor, for determining an integrated flow rate of the liquid when the liquid temperature is equal to or higher
(Continued)

than a set temperature, and for determining whether or not coolability of the dispensing device is suitable by comparing the integrated flow rate with a determination value.

8 Claims, 7 Drawing Sheets

(58) Field of Classification Search
CPC .......... B67D 1/1477; B67D 2001/1483; G01F 15/075
See application file for complete search history.

(56) References Cited

U.S. PATENT DOCUMENTS

| | | | |
|---|---|---|---|
| 7,823,411 | B2 | 11/2010 | Gagliano et al. |
| 2009/0194564 | A1* | 8/2009 | Tsubouchi ............ G01F 15/046 222/23 |
| 2013/0129885 | A1* | 5/2013 | Doglioni Majer .... A47J 31/368 426/431 |
| 2021/0009401 | A1* | 1/2021 | Yamashita .............. F25D 11/00 |

FOREIGN PATENT DOCUMENTS

| | | |
|---|---|---|
| JP | 2004-269006 | 9/2004 |
| JP | 2007-182250 | 7/2007 |
| JP | 4031242 | 1/2008 |
| JP | 2011-84276 | 4/2011 |
| JP | 5474518 | 4/2014 |
| WO | 2010/089108 | 8/2010 |
| WO | 2011/040641 | 4/2011 |

OTHER PUBLICATIONS

Extended European Search Report dated Aug. 16, 2021 in corresponding European Patent Application No. 18888751.7.

* cited by examiner

LIQUID QUALITY CONTROL DEVICE

TECHNICAL FIELD

The present invention relates to a liquid quality management device capable of being added to a liquid supply system, and more particularly, to a liquid quality management device that performs liquid quality management by utilizing, for example, coolability in a liquid dispensing device provided in the liquid supply system.

BACKGROUND ART

In a restaurant, a liquid supply system is generally used as a device for providing a liquid, for example, beer. When the beer is used as an example, the liquid supply system includes a carbon dioxide gas cylinder, a beer barrel filled with beer, a supply pipe, and a beer dispenser. The liquid supply system pressurizes the beer within the beer barrel with a carbon dioxide gas of the carbon dioxide gas cylinder, and pumps the liquid from the supply pipe to the beer dispenser. The beer dispenser has a beer cooling pipe provided within a cooling tank, a refrigeration machine, and a dispensing outlet. The beer dispenser freezes a part of a cooling water within the cooling tank by the refrigeration machine, cools the beer while causing the beer to flow within the beer cooling pipe by a lever operation at the dispensing outlet, and dispenses the beer to a drinking container such as a beer mug.

In this manner, the beer within the beer barrel is provided to a customer.

As described above, in the beer dispenser, the beer is cooled and dispensed with heat exchange between the beer passing through the beer cooling pipe immersed in the cooling water of which a part is frozen and the cooling water. Meanwhile, the beer barrel filled with the beer may be placed in a room temperature environment. Thus, a temperature of the cooling water rises near an inlet part of the beer cooling pipe in the beer dispenser due to heat exchange with the beer at a substantially room temperature, and therefore ice in the cooling water goes on melt. Accordingly, in the prior art, the refrigeration machine is operated, for example based on the detected amount of ice, to decrease the temperature of the cooling water such that the temperature of the dispensed beer is maintained in a predetermined range.

PRIOR ART DOCUMENTS

Patent Documents

Patent Document 1: JP 5474518 B
Patent Document 2: JP 4031242 B

SUMMARY OF THE INVENTION

Problems to be Solved by the Invention

However, beer orders may be concentrated at one time at restaurants, and in such a case, a freezing operation of the cooling water using the refrigeration machine is not in time, and thus, beer that is not very well cooled may be provided. It is considered that such an event occurs due to mismatching between the amount of beer consumed and the coolability of the beer dispenser.

The above Patent Document 1 discloses to focus on a relationship between the quality of the cooling water within the beer dispenser and a cooling water cooling function. The above Patent Document 2 discloses that a flow rate of each type of beverage to be dispensed can be monitored. Thus, the Patent Documents 1 and 2 do not describe to focus on the relationship between the amount of beer consumed and the coolability of the beer dispenser, as in the present application.

The present invention has been made in order to solve such problems, and an object of the present invention is to provide a liquid quality management device in which liquid quality management is performed by focusing on a flow rate of a liquid and capability of a dispensing device.

Means for Solving the Problems

To achieve the aforementioned object, the present invention has a configuration to be described below.

That is, a liquid quality management device capable of being added to a liquid supply system, the liquid supply system supplying a liquid within a storage container to a dispensing device through a supply pipe with the liquid pressurized in order to cool the liquid in the dispensing device, and dispensing the cooled liquid to a drinking container from the dispensing device, the liquid quality management device comprising:

an actual flow rate preparation unit including a flow rate sensor which detects the amount of liquid dispensed into the drinking container, and configured to determine an actual measured flow rate of the liquid dispensed into the drinking container from the dispensing device;

a dispensing liquid temperature sensor configured to measure a temperature of the liquid dispensed into the drinking container; and a determination unit electrically connected to the actual flow rate preparation unit and the dispensing liquid temperature sensor, the determination unit configured to determine an integrated flow rate of the liquid dispensed into the drinking container in a period in which the measured liquid temperature is equal to or higher than a set temperature, and to determine whether or not coolability of the dispensing device is suitable by comparing the integrated flow rate with a determination value.

Effects of the Invention

In accordance with the liquid quality management device according to the aspect, the actual flow rate preparation unit, the dispensing liquid temperature sensor, and the determination unit are provided. Thus, it is possible to determine whether or not the coolability of the dispensing device is suitable by comparing the integrated flow rate of the liquid with the temperature equal to or higher than the set temperature with the determination value, and then it is possible to perform the quality management of the liquid to be dispensed.

Specifically, according to the liquid quality management device, it is possible to determine that the coolability of the dispensing device is suitable when the integrated flow rate with the temperature equal to or higher than the set temperature among the actual measured flow rates at which the liquid is dispensed into the drinking container is smaller than the determination value, whereas it is possible to determine that the coolability is insufficient when the integrated flow rate is equal to or larger than the determination value. Further, in a state in which the integrated flow rate is smaller than the determination value, it is possible to determine whether or not the coolability of the dispensing device is excessive.

In this way, according to the liquid quality management device, it is possible to select the dispensing device having coolability matching a usage situation.

Furthermore, selecting the dispensing device having the suitable capacity in this manner leads to optimize power consumption of the refrigeration machine in addition to be able to provide the liquid having the optimum temperature to the customer. Accordingly, it is possible to contribute to energy saving, and it is possible to help cost saving at restaurants using the liquid quality management device.

EMBODIMENTS OF THE INVENTION

Figure 1:
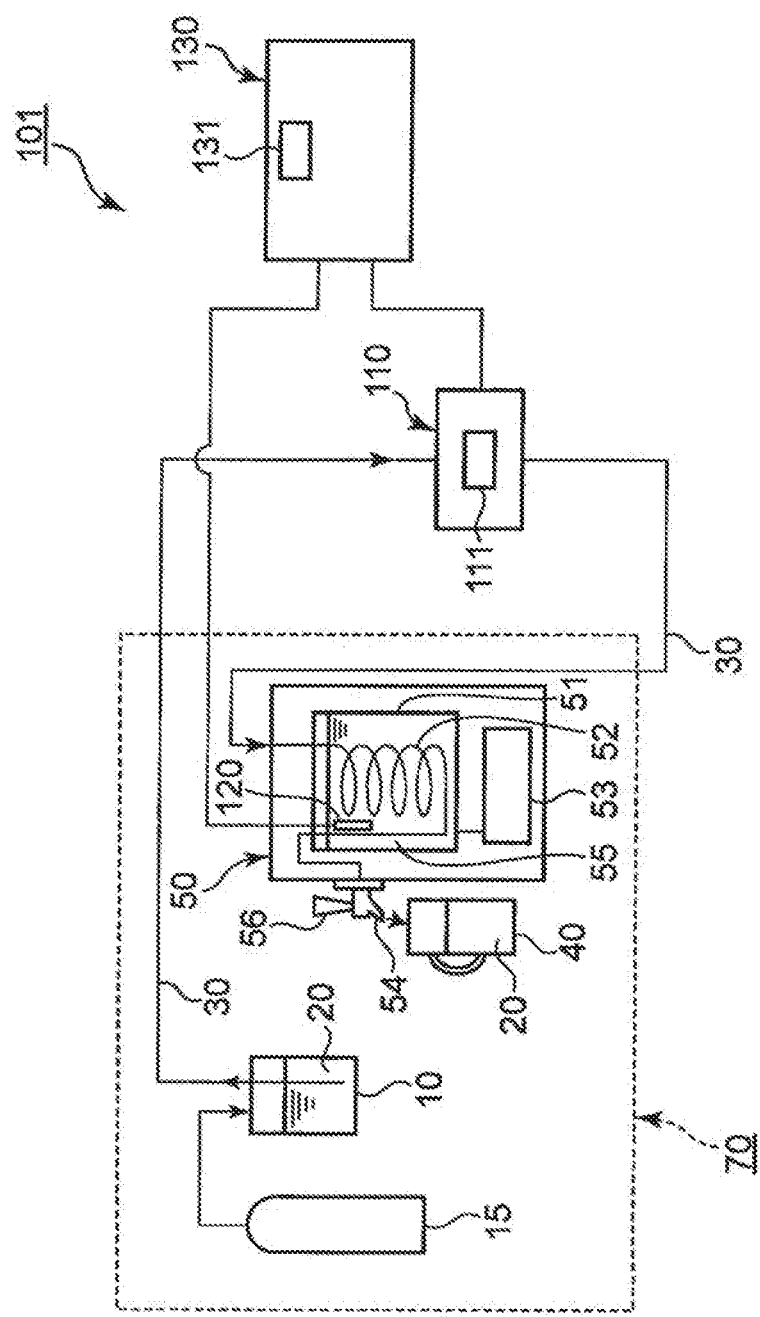
FIG. 1 is a block diagram illustrating a basic configuration of a liquid quality management device according to an embodiment of the present invention.

A liquid quality management device according to an embodiment of the present invention will be described below with reference to the drawings. In the drawings, the same or similar components are denoted by the same reference symbols. In order to avoid the following description from being unnecessarily redundant and to facilitate the understanding of those skilled in the art, detailed description of well-known matters and redundant description of substantially the same configuration may be omitted. The following description and the contents of the accompanying drawings are not intended to limit the subject matter described in the claims.

As illustrated in FIG. 1, the liquid quality management device according to the embodiment to be described below is a liquid quality management device 101 capable of being added to, that is, capable of being electrically and mechanically connected to an existing liquid supply system 70. In the present embodiment, one liquid quality management device 101 is attached to one set of liquid supply systems 70.

In the following embodiment, beer is used as an example of a liquid to be handled, but the liquid is not limited to beer. Alcohol drinks such as low-malt beer, liqueur, shochu highball, whiskey, and wine, drinking water, soft drinks, and carbonated drinks may be used.

Here, the liquid supply system 70 includes a storage container 10, a pressurization source 15, a supply pipe 30, and a dispensing device 50, an is a system that supplies, that is, transfers a liquid (beer in the embodiment as described above) 20 within the storage container 10 to the dispensing device 50 through the supply pipe 30 with pressurization by using the pressurization source 15, and dispenses the liquid from the dispensing device 50 to a drinking container (for example, a cup, a beer mug, or a pitcher) 40. Here, in the embodiment, the storage container 10 is a stainless steel container called as a beer barrel filled with beer in a beer manufacturer, and has a capacity of, for example, 5 liters, 10 liters, or 19 liters. The pressurization source 15 is a carbon dioxide gas cylinder. The supply pipe 30 is a flexible resin tube made of, for example, polyamide, polyurethane, or polyester which enables beer to flow between the storage container 10 and the dispensing device 50. As will be described below, a device included in the liquid quality management device 101 is attached to the supply pipe 30. It is preferable that inner diameters of flow passages of a fluid from the supply pipe 30 to a liquid dispensing outlet 54 in the dispensing device 50 are designed to have the same dimension such that a cleaning with a sponge becomes easy.

In the embodiment, a beer dispenser (may be referred to as a "beer server") will be described as an example of the dispensing device 50 (hereinafter, may be accordingly referred to as the beer dispenser 50). As already described above, the beer dispenser 50 includes a liquid cooling pipe (beer cooling pipe in the embodiment) 52 disposed inside a cooling tank 51, a refrigeration machine 53, and the liquid dispensing outlet 54. The beer dispenser freezes a part of a cooling water 55 within the cooling tank 51 by using the refrigeration machine 53, and cools the liquid (beer) 20 passing through the beer cooling pipe 52 by using the cooling water 55. The beer 20 transferred by the pressurization source 15 passes through the beer cooling pipe 52 by operating a lever 56 at the dispensing outlet 54 while being cooled by heat exchange with the cooling pipe, is dispensed into the drinking container 40 such as the beer mug, and is provided to a customer. The refrigeration machine 53 operates according to a rise in temperature of the cooling water 55 due to the aforementioned heat exchange, and the temperature of the cooling water 55 is controlled. However, for example, when the liquid is continuously dispensed into many drinking containers 40, the coolability of the refrigeration machine 53 cannot keep up and the liquid 20 exceeding a set temperature may be dispensed.

The beer dispenser 50 is generally used in an environment in which an external air temperature is equal to or higher than 5° C. and is equal to or lower than 40° C. The liquid 20 handled by the dispensing device 50 is not limited to the beer, and may be a drinking water. In the embodiment, the beer dispenser 50 cools the beer as a target liquid, but the dispensing device 50 included in the embodiment may also heat the target liquid or keep the target liquid warm.

Hereinafter, the liquid quality management device 101 according to the embodiment will be described in detail.

In the present embodiment, the liquid quality management device 101 is a device which can determine whether or not the coolability of the dispensing device 50 (beer dispenser 50) is good, more specifically, whether or not the coolability of the dispensing device 50 with respect to a fluid amount of the liquid 20 to be dispensed into the drinking container 40 is suitable and can maintain good quality of the liquid 20 to be dispensed.

Figure 2:
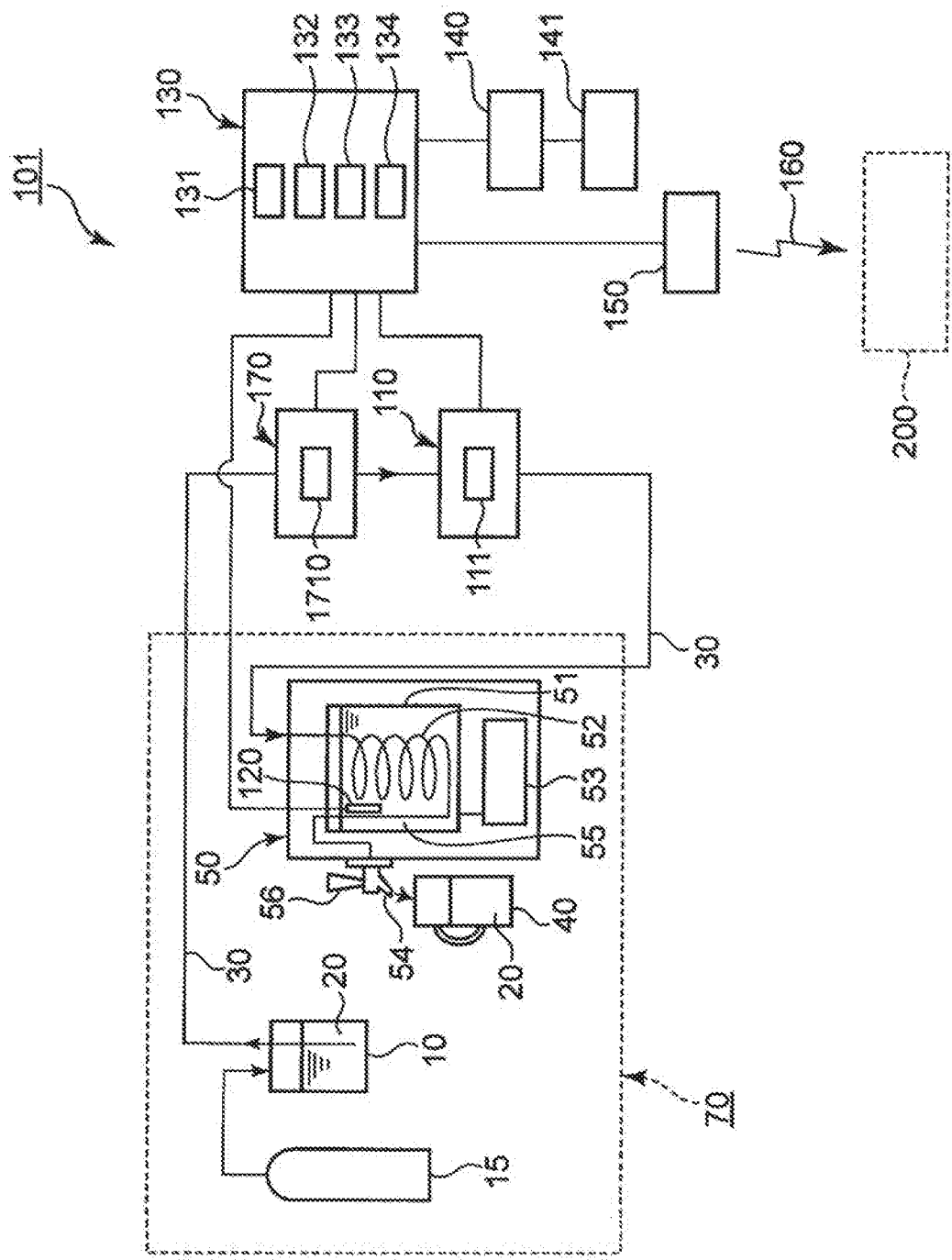
FIG. 2 is a block diagram illustrating a modification example of the liquid quality management device illustrated in FIG. 1.

As illustrated in FIG. 1, such a liquid quality management device 101 includes, as basic configurations, an actual flow rate preparation unit 110, a dispensing liquid temperature sensor 120, and a determination unit 130. In addition to these basic configurations, the liquid quality management device 101 may further include a warning unit 140, a display device 141, a transmission and reception unit 150, and a fluid flow path adjustment device 170 as illustrated in FIG. 2.

These components will be sequentially described below.

The actual flow rate preparation unit 110 has a flow rate sensor 111 that detects the amount of liquid dispensed into the drinking container 40, and the actual flow rate determining unit determines an actual measured flow rate of the liquid 20, that is, the beer in the embodiment, dispensed into the drinking container 40 from the dispensing device 50 based on a detection signal of the flow rate sensor 111. Whether or not the detection signal from the flow rate sensor 111 is sent corresponds to whether or not an operation of dispensing the liquid 20 is executed. In the embodiment, the flow rate sensor 111 sends the detection signal, for example, every 0.1 seconds, and the actual flow rate preparation unit 110 also prepares an actual flow rate every Δt time, for example, every 0.1 seconds described above.

In the embodiment, the flow rate sensor 111 is installed at an appropriate position between an outlet of the storage container 10 and the beer dispenser 50 so as to sandwich the beer passing through the supply pipe 30. The installation position is not limited thereto, and the flow rate sensor may be attached to, for example, the supply pipe 30 of the dispensing device 50. In the embodiment, an ultrasonic sensor is used as the flow rate sensor 111.

The dispensing liquid temperature sensor 120 is a sensor which directly or indirectly measures the temperature of the liquid 20 to be dispensed into the drinking container 40, and for example, a thermocouple, a resistance temperature detector, and a thermistor may be used. An installation position of the sensor 120 is an appropriate position between the liquid cooling pipe 52 and the liquid dispensing outlet 54 in the dispensing device 50. In the present embodiment, the dispensing liquid temperature sensor 120 is located at a surface layer part of the cooling water 55 on the liquid cooling pipe 52 immersed in the cooling water 55, and is installed in contact with an outer surface of the liquid cooling pipe 52. An example of the surface layer part corresponds to an upper and lower range in which a position is centered at about 5 cm below a liquid surface of the cooling water 55. However, the installation position is not limited thereto, and may be, for example, an inner surface of the liquid cooling pipe 52 at the surface layer part, and the dispensing liquid temperature sensor 120 may directly detect the liquid temperature. In this configuration, when the liquid 20 is drinkable like the beer, the dispensing liquid temperature sensor 120 is installed with a structure that complies with laws and regulations. Alternatively, the dispensing liquid temperature sensor may be installed outside the cooling water 55, for example, in contact with the liquid cooling pipe 52, or may be installed at such as the liquid dispensing outlet 54.

The determination unit 130 is electrically connected to the actual flow rate preparation unit 110, the dispensing liquid temperature sensor 120, and also the fluid flow path adjustment device 170 in the present embodiment. Further in the present embodiment, the determination unit 130 includes a time information generation unit 131 generating time information for month, day, hour, and minute.

Such a determination unit 130 determines an integrated flow rate of the liquid (beer) 20 dispensed into the drinking container 40 based on the actual measured flow rate obtained from the actual flow rate preparation unit 110 for a period in which the temperature of the liquid 20 (beer in the present embodiment) measured by the dispensing liquid temperature sensor 120 is equal to or greater than a set temperature (for example, 8° C. in the present embodiment) by utilizing the time information. The determination unit 130 also determines whether or not the coolability of the dispensing device 50 is suitable by comparing the determined integrated flow rate with a predetermined determination value (flow rate value).

The operation of the determination unit 130 including the operation of determining whether or not the coolability is suitable will be described below in detail with reference to FIG. 5.

The determination unit 130 may further include a value-added information preparation unit 132 (FIG. 2). The value-added information preparation unit 132 prepares value-added warning information by adding information of month, day, hour, and minute included in the time information generated with the time information generation unit 131 into the result of determining whether or not the coolability is suitable, particularly, into information on the determination that the coolability is insufficient.

Furthermore, the determination unit 130 may include a determination value change unit 133 (FIG. 2) for changing the aforementioned determination value. That is, as described above, since the liquid 20 is cooled with the heat exchange between the liquid 20 and the cooling water 55, the coolability of the dispensing device 50 is influenced by a flow velocity of the liquid 20 flowing in the liquid cooling pipe 52. The flow velocity also changes based on the fact that a length of the liquid cooling pipe 52 differs depending on types of the dispensing devices 50. Thus, for example, the determination value change unit 133 determines the flow velocity of the liquid 20 from the amount of liquid per unit time obtained by the actual flow rate preparation unit 110, and changes the aforementioned determination value according to the obtained flow velocity. Also, the determination value change unit 133 can change the determination value according to the types of the dispensing devices 50.

Further, the determination unit 130 may include a total value preparation unit 134 (FIG. 2) described in detail later.

Such a determination unit 130 is actually realized by using a computer, and is constituted by utilizing software corresponding to each of the aforementioned functions with the time information generation unit 131, the value-added information preparation unit 132, the determination value change unit 133, and the total value preparation unit 134, and by utilizing hardware composed with such as a central processing unit (CPU) and a memory for executing the software. It is preferable that the computer actually corresponds to a microcomputer incorporated in the liquid quality management device 101, but a stand-alone personal computer may be used.

Next, the warning unit 140 illustrated in FIG. 2 will be described. The warning unit 140 is electrically connected to the determination unit 130, and generates warning information when the determination unit 130 determines that the coolability of the dispensing device 50 is insufficient. The display device 141 visually displaying the warning information may be connected to the warning unit 140.

The transmission and reception unit 150 is electrically connected to the determination unit 130, and transmits various information generated by the determination unit 130 to a communication line 160. Thus, the transmission and reception unit 150 can transmit the value-added warning information prepared by the value-added information preparation unit 132 of the determination unit 130, for example. Here, the transmission and reception unit 150 may transmit just information regarding the actual measured flow rate without adding the time information and information generated by the determination unit 130. The transmission and reception unit 150 can receive information from the communication line 160, and can supply the received information to the determination unit 130.

The fluid flow path adjustment device 170 will be described with reference to FIGS. 6A to 6D.

The fluid flow path adjustment device 170 is a device as disclosed in, for example, JP 5649801 B by the applicant of the present invention, and is a device that is mounted with respect to the supply pipe 30 and stops the dispensing of the beer (the liquid 20) from the liquid dispensing outlet 54 into the drinking container 40. The fluid flow path adjustment device 170 can prevent the carbon dioxide gas which is a pressurized gas from being ejected from the liquid dispensing outlet 54 of the dispensing device 50, for example, when the beer within the storage container 10 is exhausted (when the storage container 10 is empty) while the liquid 20 is being dispensed and when the storage container 10 is replaced.

Figure 6A:
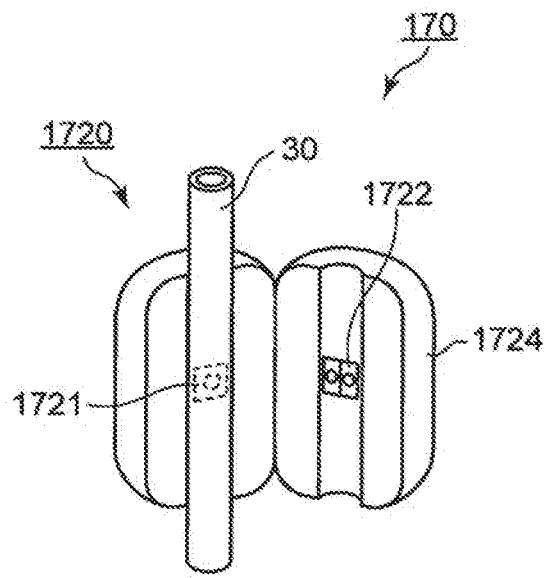
FIG. 6A is a perspective view illustrating a detection unit included in a fluid flow path adjustment device provided in the liquid quality management device illustrated in FIG. 2.
Figure 6B:
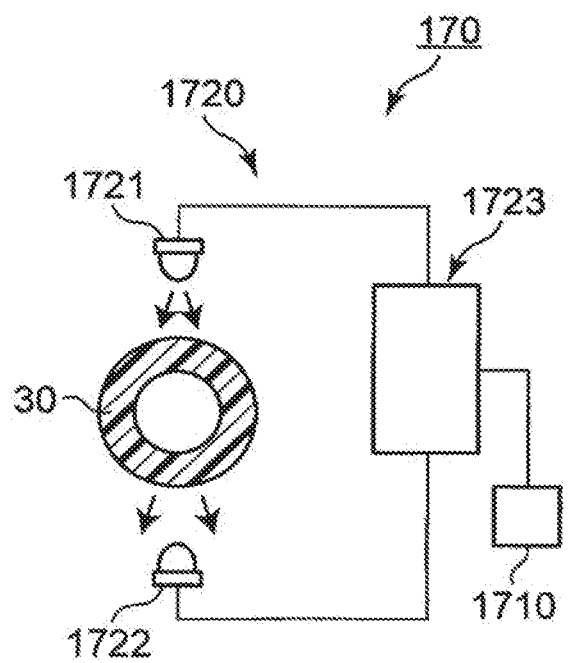
FIG. 6B is a diagram illustrating a schematic configuration of the fluid flow path adjustment device illustrated in FIG. 6A.

In order to prevent such ejection of the carbon dioxide gas, the fluid flow path adjustment device 170 includes a fluid stopper device 1710 and a detection unit 1720. As illustrated in FIGS. 6A and 6B, the detection unit 1720 includes a light emitting element 1721, a light receiving element 1722, and a liquid state determination unit 1723. The light emitting element 1721 and the light receiving element 1722 are positioned at a housing 1724 in the fluid flow path adjustment device 170, the housing being arranged so as to sandwich the resin supply pipe 30 within the fluid flow path adjustment device 170, and the elements being arranged to be opposed to each other across the beer passing through the supply pipe 30. The light emitting element 1721 emits infrared light, and the light receiving element 1722 receives the emitted infrared light. The light emitting element 1721 and the light receiving element 1722 are electrically connected to the liquid state determination unit 1723 that detects the state of the passing beer. That is, a refractive index of the light traveling from the light emitting element 1721 to the light receiving element 1722 varies depending on whether an object passing through the supply pipe 30 is a liquid, gas, or a mixture thereof. Therefore, the amount of light received by the light receiving element 1722 varies depending on the object passing through the supply pipe 30. The liquid state determination unit 1723 detects a change in the amount of received light, and activates the fluid stopper device 1710 when the passing object becomes gas.

Figure 6C:
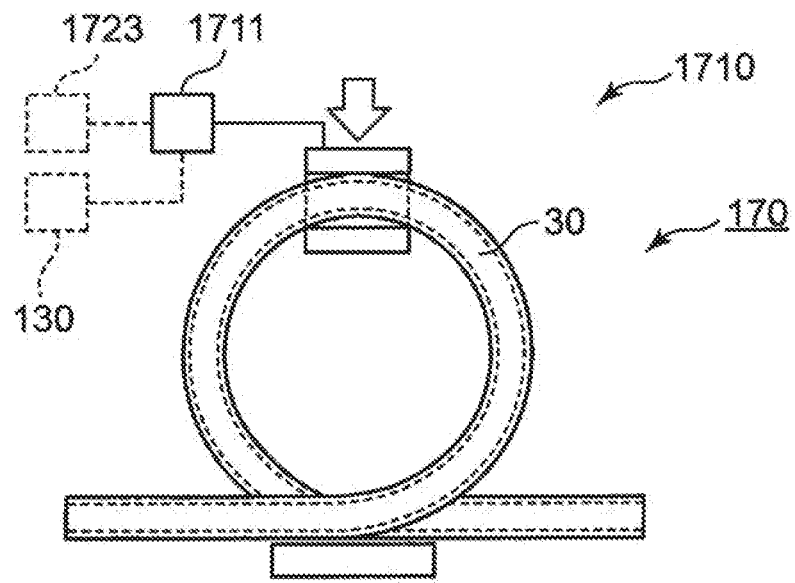
FIG. 6C is a diagram for describing a schematic configuration and operation of a fluid stopper device included in the fluid flow path adjustment device illustrated in FIG. 6A.
Figure 6D:
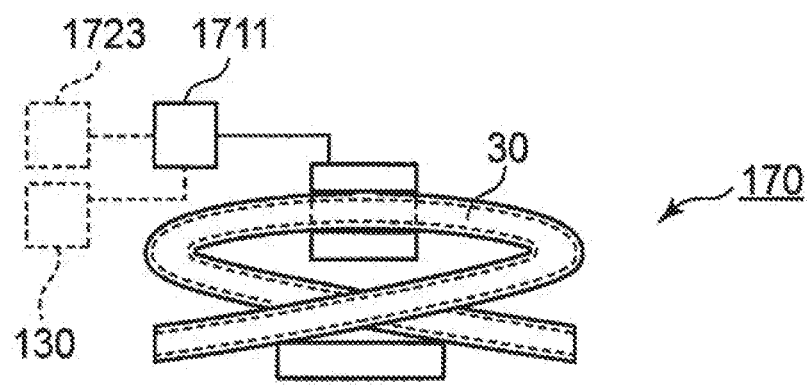
FIG. 6D is a diagram for describing a schematic configuration and operation of the fluid stopper device included in the fluid flow path adjustment device illustrated in FIG. 6A.

As illustrated in FIGS. 6C and 6D, the fluid stopper device 1710 includes, as a configuration example, the supply pipe 30 arranged in a loop shape, and a movement mechanism 1711 for moving a holding unit that holds the supply pipe 30.

The movement mechanism 1711 moves the supply pipe 30 in an arrow direction with the control of the liquid state determination unit 1723, and thus, a flow path is blocked by bending and crushing the supply pipe 30. The supply pipe 30 of which the flow path is blocked is returned by the movement mechanism 1711.

The fluid flow path adjustment device 170 having such a configuration and operation is electrically connected to the determination unit 130 in the present embodiment. Thus, the operation of the fluid stopper device 1710 in the fluid flow path adjustment device 170 may be controlled by the determination unit 130.

In the operation control using the determination unit 130, the operation of the fluid stopper device 1710 may be controlled by the determination unit 130 according to the information received by the transmission and reception unit 150.

The liquid quality management device 101 in the embodiment having the configuration described above operates as follows.

The store staff manipulates the lever 56 in the dispensing device (beer dispenser) 50, and thus, the liquid (beer) 20 is dispensed into the drinking container 40. The amount of dispensed beer is measured by using the actual flow rate preparation unit 110, information obtained is supplied, as the actual measured flow rate, to the determination unit 130.

Next, an operation of the determination unit 130 including an operation of determining whether or not the coolability is suitable in the dispensing device 50 will be described with reference to FIGS. 3A, 3B, 3C, 4, and 5. As a precondition for the operation of determining whether or not the coolability is suitable, it is assumed that the liquid 20 is transferred at a set pressure, in other words, at a set flow velocity with the pressurization source 15 and the refrigeration machine 53 in the dispensing device 50 operates normally.

In FIGS. 3A, 3B, 3C, and 4, a heavy black line represents a dispensing operation period during which the liquid 20 is dispensed into one drinking container 40 such as a cup, a beer mug, or a pitcher.

First, a change of the liquid temperature measured by using the dispensing liquid temperature sensor 120 will be described.

As already described, due to the operation of the lever 56 at the liquid dispensing outlet 54, the liquid (beer) 20 transferred with the pressure of the pressurization source 15 passes through the liquid cooling pipe 52, is cooled with heat exchange between the liquid 20 and the cooling water 55, and is dispensed into the drinking container 40. As in the present embodiment, in a state in which the dispensing liquid temperature sensor 120 is installed within the cooling water 55, the temperature of the liquid 20 measured by the dispensing liquid temperature sensor 120 changes, for example, as illustrated in FIG. 3A.

That is, when the dispensing of the liquid 20 is started from time t1 and then a dispensing operation is continuously or almost continuously performed to one or a plurality of drinking containers 40, the liquid temperature measured by the dispensing liquid temperature sensor 120 usually starts to rise immediately after the time t1. At this time, as described above, information on the amount of liquid dispensed is supplied from the actual flow rate preparation unit 110 to the determination unit 130 every Δt time (in the present embodiment, for example, every 0.1 seconds).

Due to the heat exchange between the liquid 20 and the cooling water 55 associated with the continuous dispensing operation, the temperature of the cooling water 55 rises, and accordingly, the measured liquid temperature also continues to rise. At time t2 after the time t1, the measured liquid temperature reaches a set temperature ST (for example, 8° C.) predetermined in the determination unit 130 in advance.

Figure 3A:
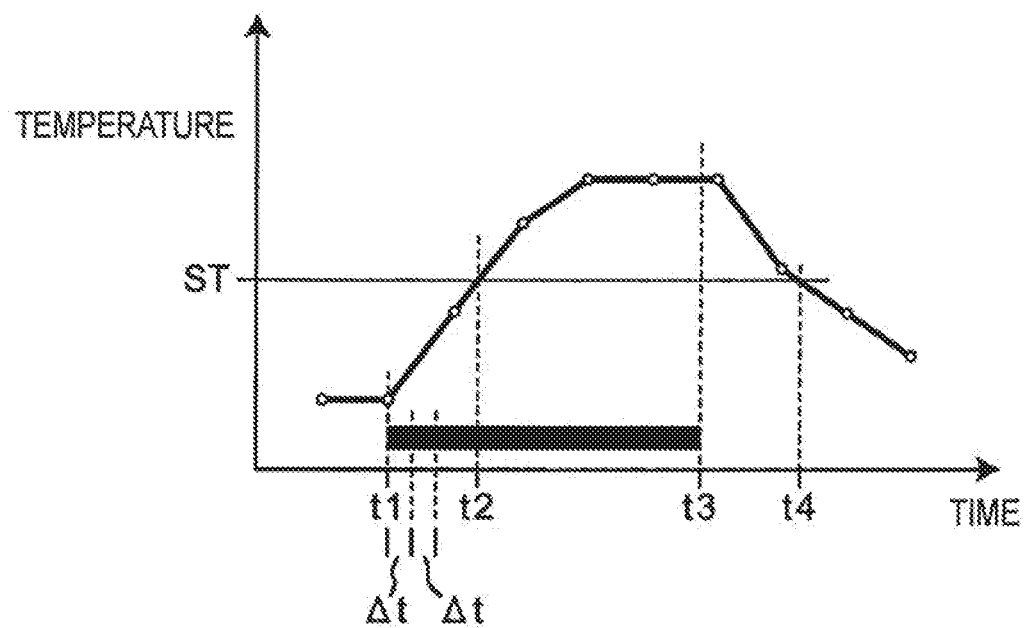
FIG. 3A is a graph illustrating an example of a change in liquid temperature measured in the liquid quality management device illustrated in FIGS. 1 and 2 and illustrating a temperature change corresponding to insufficient coolability.

In FIG. 3A, the liquid temperature appears to exceed the set temperature ST during one dispensing operation period into the drinking container 40. However, this example corresponds to an example in which the drinking container 40 is, for example, a beer mug and the beer is intermittently dispensed into a plurality of beer mugs. Thus, when the beer is dispensed into only one beer mug, the liquid temperature does not usually reach the set temperature ST during the dispensing operation period. On the other hand, when the drinking container 40 such as the pitcher has a larger capacity than the drinking container 40 such as the cup or the beer mug, the liquid temperature might reach the set temperature ST during the single dispensing operation period into only one drinking container.

The raised temperature of the cooling water 55 starts to decrease due to the termination of the dispensing of the liquid 20 from the dispensing device 50. As a result, the rising of the measured liquid temperature also becomes to slow down and stops as illustrated in FIG. 3A, and eventually the liquid temperature also decreases. Accordingly, in the example illustrated in FIG. 3A, the liquid temperature measured is equal to or higher than the set temperature ST during a period from time t2 to time t4.

Next, in the liquid temperature change as mentioned above, an operation including determination of the coolability in the determination unit 130 will be described with reference to FIG. 5.

Figure 5:
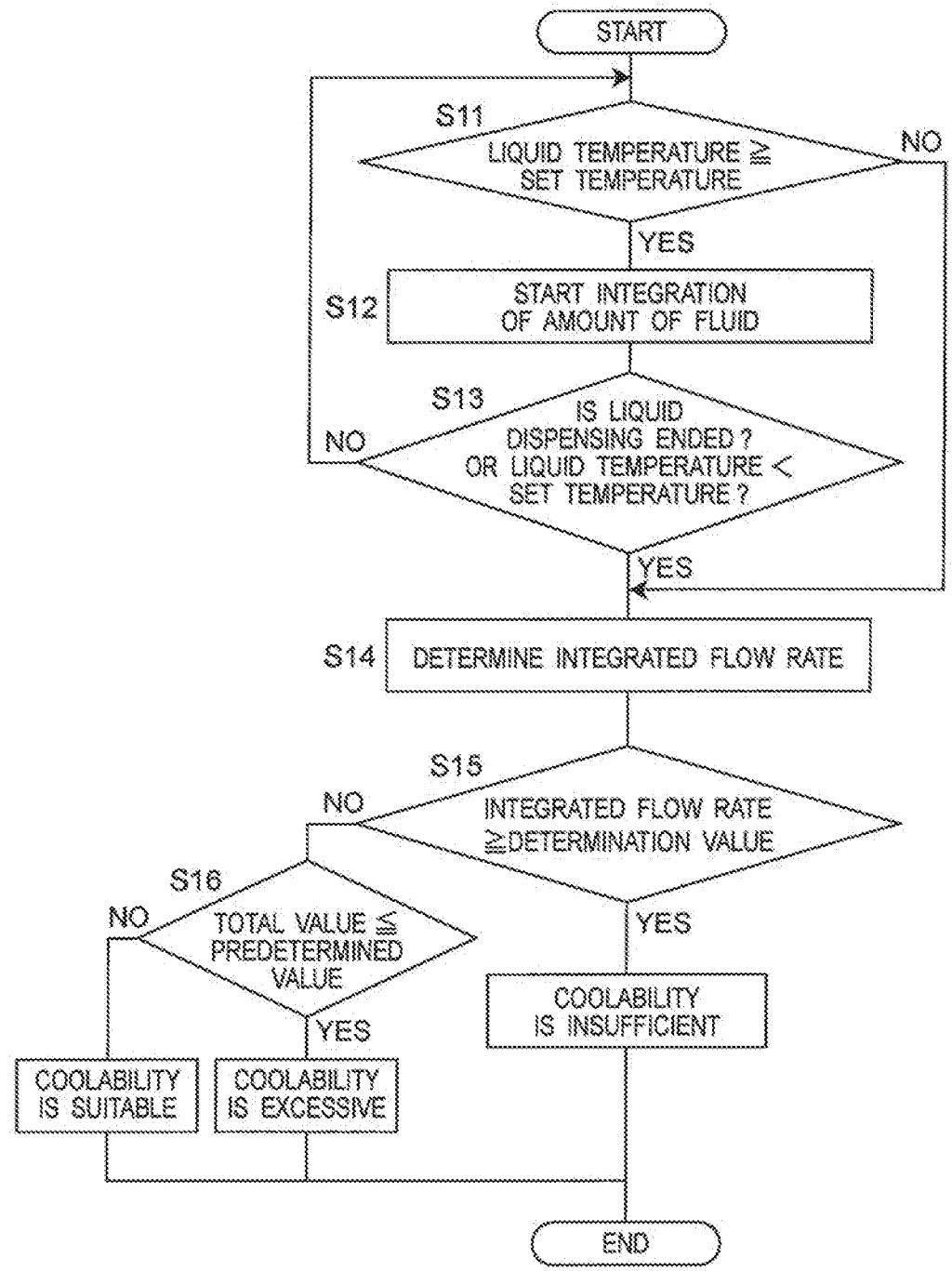
FIG. 5 is a flowchart illustrating a determination operation executed by a determination unit provided in the liquid quality management device illustrated in FIGS. 1 and 2.

In step S11 in FIG. 5, the determination unit 130 determines whether or not the liquid temperature measured by the dispensing liquid temperature sensor 120 reaches the set temperature ST. Here, the set temperature ST may be set to, for example, 8° C. When the liquid temperature reaches the set temperature ST, that is, at time t2 in the aforementioned example, the determination unit 130 starts to integrate the amount of liquid supplied every Δt time from the actual flow rate preparation unit 110, in the next step S12. Thereafter, the determination unit 130 continues to integrate the amount of liquid until a determination point of time of the next step S13.

In the step S13, the determination unit 130 determines whether or not the dispensing of the liquid is terminated on the basis of the detection of the actual flow rate preparation unit 110, that is, on the basis of whether or not the information on the actual measured flow rate is supplied from the actual flow rate preparation unit 110, or whether or not the liquid temperature is lower than the set temperature ST based on the information on the liquid temperature from the dispensing liquid temperature sensor 120.

As illustrated in FIG. 3A, after the time t2, in a case the dispensing operation of the liquid 20 is terminated at time t3 before time t4, that is, the dispensing operation for one drinking container 40 is terminated at the time t3, the determination unit 130 continues to integrate the amount of liquid from the time t2 to the time t3, and determines the integrated flow rate (step S14). As already described, the termination as well as the start of the dispensing operation can be determined depending on whether or not there is the detection signal of the flow rate sensor 111. Also, as described above, the integrated flow rate is decided by the termination of the dispensing operation, and after the determination, the determination unit 130 resets the integrated flow rate obtained and prepares for the next integration operation.

Meanwhile, in a case that an ending time of the dispensing operation of the liquid 20 is after the time t4, the determination unit 130 determines the integrated flow rate from the time t2 to the time t4 corresponding to a period in which the liquid temperature is equal to or higher than the set temperature ST (step S13 and step S14).

In the present embodiment, as seen above, a period in which the integrated flow rate is determined corresponds to a period required to dispense a liquid into essentially one drinking container 40, and corresponds to a period in which the liquid temperature measured by the dispensing liquid temperature sensor 120 is equal to or higher than the set temperature ST, or a period in which the liquid is being dispensed within a period of the set temperature ST or higher.

In the next step S15, the determination unit 130 determines whether or not the obtained integrated flow rate is equal to or larger than a predetermined determination value. When the integrated flow rate is equal to or larger than the determination value, the determination unit 130 determines that the coolability of dispensing device 50 is insufficient.

Here, in the present embodiment, for example, the determination value is set to a value smaller than a capacity of one drinking container 40 having the smallest capacity among drinking containers with various sizes used in restaurants. In the present embodiment, for example, the determination value can be set a value such as 100 ml or 300 ml. For example, when the determination value is 100 ml, if the integrated flow rate with the set temperature ST or higher obtained in the step S14 is, for example, 300 ml, the determination unit 130 determines that the coolability of the dispensing device 50 is insufficient. In this example, specifically, when the drinking container 40 is, for example, a medium beer mug (about 300 ml per mug), almost all the entire amount is the liquid (beer) 20 of the set temperature ST or higher, that is, of a temperature of 8'C or higher, and is so-called "warm" beer.

Figure 3B:
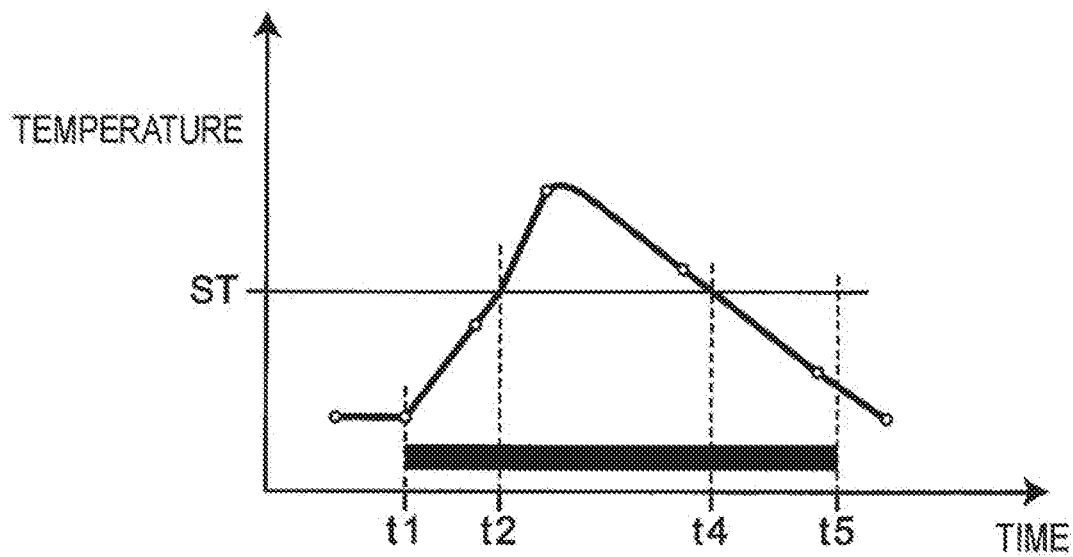
FIG. 3B is a diagram illustrating an example of the change in liquid temperature measured in the liquid quality management device illustrated in FIGS. 1 and 2 and illustrating a case where the coolability is sufficient.

Meanwhile, when the obtained integrated flow rate is smaller than the determination value, the determination unit 130 determines that the coolability of the dispensing device 50 is sufficient and suitable. For example, as illustrated in FIG. 3B, when the liquid is dispensed into one drinking container 40 from time t1 to time t5, even though the liquid of the set temperature ST or higher is dispensed from time t2 to time t3, in a case where the integrated flow rate from the time t2 to the time t3 is smaller than the determination value, the determination unit 130 determines that the coolability of the dispensing device 50 is sufficient and suitable.

However, the aforementioned method is an example as the processing method in step S15, and the present invention is not limited thereto. It has been described in the present embodiment that the determination operation is performed for one drinking container 40. However, for example, the determination unit 130 may determine the integrated flow rate corresponding to a set time by using the time information generated by the time information generation unit 131 of the determination unit 130, and then may compare the obtained integrated flow rate with the determination value. In this case, the determination value may be calculated by multiplying a reference value per unit time by the set time.

Figure 3C:
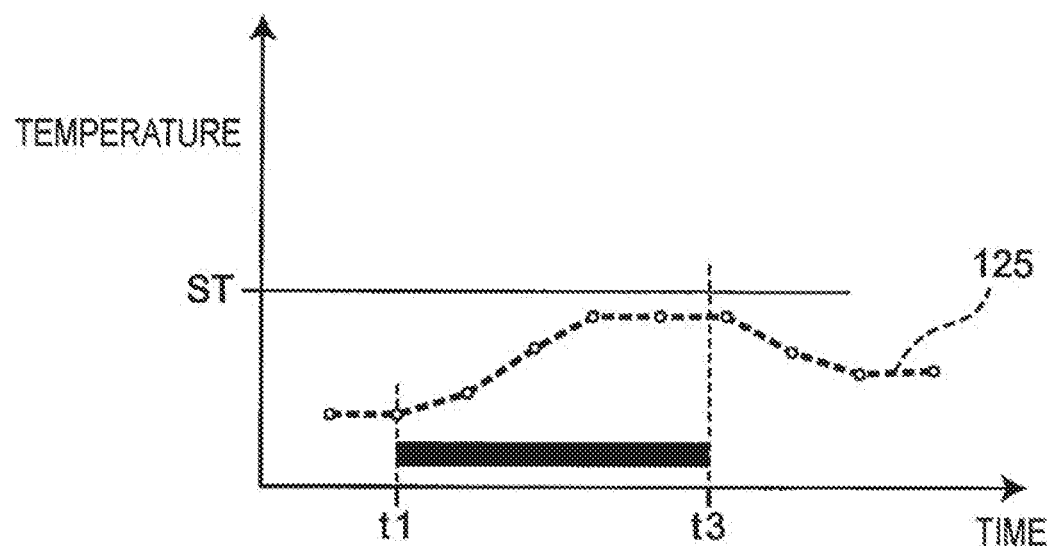
FIG. 3C is a graph illustrating an example of the change in liquid temperature measured in the liquid quality management device illustrated in FIGS. 1 and 2 and illustrating a temperature change corresponding to suitable or excessive coolability.

Although the description will go back and forth, for example, like a liquid temperature 125 indicated with a dotted line in FIG. 3C, when the liquid temperature 125 rises with the dispensing operation, but falls below the set temperature ST, the determination unit 130 can determine that the coolability of the dispensing device 50 is suitable.

When the obtained integrated flow rate is smaller than the determination value, the determination unit 130 may further perform the following determination. In this case, the determination unit 130 further includes the total value preparation unit 134 that performs the following totalization of the flow rates in a set period.

That is, as illustrated in the next step S16, the total value preparation unit 134 determines a total value by adding up flow rates of the liquid 20 during the set period, the flow rates being measured by the flow rate sensor 111 and having a temperature lower than the set temperature ST. Then, when the total value is smaller than a predetermined value, the determination unit 130 determines that the coolability of the dispensing device 50 is excessive. Meanwhile, when the total value is equal to or larger than the predetermined value in a state that the integrated flow rate is smaller than the determination value, the determination unit 130 determines that the coolability of the dispensing device 50 is sufficient and suitable.

Here, the set period corresponds to, for example, one business day. At this time, the total value is a flow rate value obtained by adding up the flow rates in the set temperature ST or lower within the period of one business day. As for the predetermined value, for example, a target flow rate value set in advance with respect to each dispensing device 50 so as not to cause the insufficient coolability, or a value of about 70% of a manufacturer recommended value of the dispensing device 50 may be set as the predetermined value. Specifically, in a case that the target flow rate value is 20 liters and the predetermined value is 14 liters, if the total value is, for example, 10 liters, the coolability of the dispensing device 50 is determined to be excessive, and if the total value is, for example, 17 liters, the coolability is determined to be suitable.

Although the aforementioned explanation corresponds to a case where the dispensing liquid temperature sensor 120 is disposed within the cooling water 55 as in the present embodiment, the dispensing liquid temperature sensor 120 may be installed outside the cooling water 55, for example, at the liquid dispensing outlet 54. In this case, the liquid temperature measured by the dispensing liquid temperature sensor 120 changes as illustrated in FIG. 4.

That is, before the dispensing operation of the liquid 20, the dispensing liquid temperature sensor 120 detects approximately a room temperature (for example, around 25° C.). At time t11, when the dispensing operation is started, since a temperature measured by the dispensing liquid temperature sensor is the temperature of the dispensed liquid 20, the measured liquid temperature sharply decreases to the set temperature ST or lower. Subsequently, as in the case of FIG. 3A, the liquid temperature reaches the set temperature ST at time t12 through the continuous or intermittent dispensing operation into one or the plurality of drinking containers 40. Thereafter, the rising of the liquid temperature becomes to slow down and stops due to the operation of the refrigeration machine 53. When the dispensing operation is ended at time t13, the measured liquid temperature rises substantially toward the room temperature again.

Figure 4:
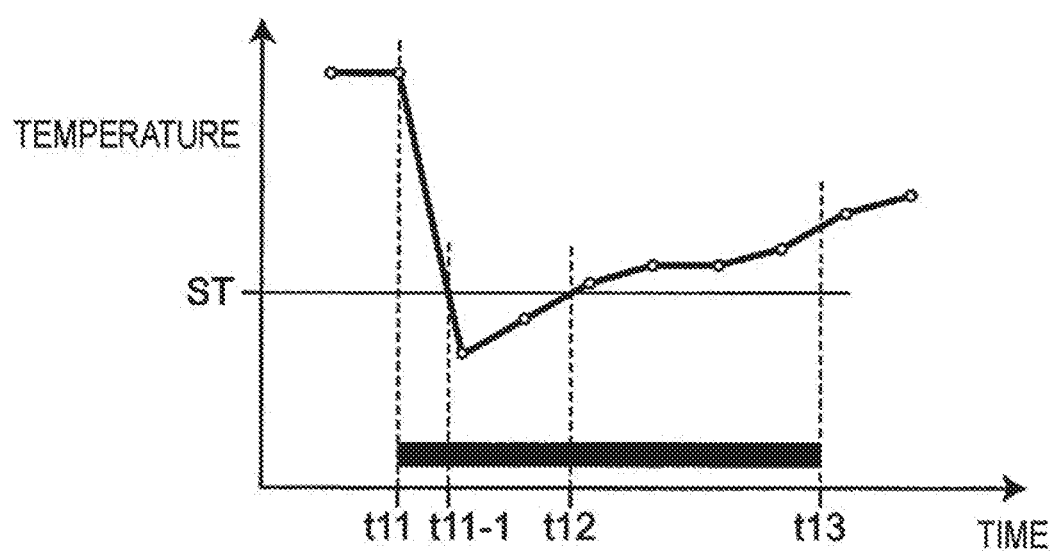
FIG. 4 is a graph illustrating another example of the change in liquid temperature measured in the liquid quality management device illustrated in FIGS. 1 and 2.

Even when the liquid temperature to be measured represents a change as illustrated in FIG. 4, the determination unit 130 can work the aforementioned operation described with reference to FIGS. 3A to 3C. At this time, the integrated flow rate corresponds to flow rates from time t11 to time t11-1 and from time t12 to time t13 in the dispensing operation with respect to one drinking container 40. Here, a period from time t11 to time t11-1 is instantaneous, and the integrated flow rate in this period can be ignored.

According to the liquid quality management device 101 including the determination unit 130 that performs the operation described above, the following effects can be achieved.

The determination unit 130 can compare the integrated flow rate of the liquid 20 dispensed into one drinking container 40 in the period in which the temperature of the liquid (beer) 20 is equal to or higher than the set temperature ST with the determination value, and can determine whether or not the coolability of the dispensing device (beer dispenser) 50 is suitable according to this comparison result. As a result, the quality management of the liquid 20 to be dispensed can be performed.

That is to say, since a concept of the integrated flow rate is used as a criterion for judgment, it is possible to detect the normalized, i.e., continued insufficient coolability rather than temporary insufficient coolability of the beer dispenser 50. Specifically, even in a severe situation for the beer dispenser 50, for example, even in the intermittent beer (liquid) dispensing operation for the plurality of drinking containers 40, it is possible to select the beer dispenser 50 having the coolability suitable to provide the beer 20 having, for example, a temperature lower than the set temperature ST to the customer. Therefore, the quality control of the beer 20 can be performed for the customer.

For example, in the configuration having the warning unit 140 and the display device 141, the warning information such as insufficient coolability can be prepared based on the determination result of the determination unit 130, and can be further displayed on the liquid quality management device 101. Therefore, the staff of the restaurant can recognize the warning information, and then it is useful for quality management of the beer 20 for the customer.

In the configuration having the transmission and reception unit 150, information obtained by adding the time information for month, day, hour, and minute to various information including such as the warning information which indicates that the coolability is insufficient and is generated by the determination unit 130 can be transmitted as the value-added warning information to the communication line 160. As described above, the information may be transmitted without adding the time information.

Therefore, for example, an analysis device 200 (computer) in the beer manufacturer connected to the communication line 160 can obtain, for example, the value-added warning information from each restaurant. Therefore, the beer manufacturer can select and recommend the beer dispenser 50 having coolability corresponding to the continuous dispensing operation (in other words, a busy time) of the beer 20 at each restaurant. Meanwhile, it is also possible to determine that the beer dispenser 50 has excessive coolability. Thus, according to the liquid quality management device 101, it is possible to select the dispensing device 50 having coolability suitable for a usage situation of the dispensing device 50.

In addition, selecting the dispensing device 50 with the suitable capacity in this manner also leads to optimize power consumption of the refrigeration machine 53. Therefore, it is possible to contribute to energy saving, and it is possible to help cost saving at such as restaurants using the beer dispenser 50.

The following effects can be achieved as accompanying effects. That is, as already described, in the present embodiment, the dispensing liquid temperature sensor 120 is located at a surface layer part of the cooling water 55 on the liquid cooling pipe 52 immersed in the cooling water 55, and is installed in contact with an outer surface of the liquid cooling pipe 52. Thus, when the refrigeration machine 53 in the dispensing device 50 is operating normally, the liquid temperature, which has once risen, begins to decrease when the dispensing is stopped, as illustrated and described in FIG. 3A.

Accordingly, if a situation in which the measured liquid temperature does not start to decrease even though the dispensing of the liquid 20 is stopped is detected, it is possible to determine a failure of the refrigeration machine 53 or a stirring device provided to stir the cooling water 55.

It is possible to adopt a configuration in which the aforementioned configurations are appropriately combined. In the present embodiment, "electrically connected" is a concept that includes not only wired connection but also wireless connection.

Although the present invention has been fully described in connection with preferred embodiments thereof with reference to the accompanying drawings, various changes and modifications will be apparent to those skilled in the art. It is to be understood that such changes and modifications are intended to be included therein without departing from the scope of the invention as set forth in the appended claims.

All the disclosure contents of the specification, drawings, claims, and abstract of Japanese Patent Application No. 2017-236783 filed on Dec. 11, 2017 are incorporated herein by reference.

INDUSTRIAL APPLICABILITY

The present invention is applicable to a liquid quality management device that can be added to a liquid supply system.

DESCRIPTION OF REFERENCE SYMBOLS

10 STORAGE CONTAINER
30 SUPPLY PIPE
40 DRINKING CONTAINER
50 DISPENSING DEVICE
52 LIQUID COOLING PIPE
54 LIQUID DISPENSING OUTLET
70 LIQUID SUPPLY SYSTEM
101 LIQUID QUALITY MANAGEMENT DEVICE
110 ACTUAL FLOW RATE PREPARATION UNIT
111 FLOW RATE SENSOR
120 DISPENSING LIQUID TEMPERATURE SENSOR
130 DETERMINATION UNIT
131 TIME INFORMATION GENERATION UNIT
132 VALUE-ADDED INFORMATION PREPARATION UNIT
133 DETERMINATION VALUE CHANGE UNIT
140 WARNING UNIT
150 TRANSMISSION AND RECEPTION UNIT
160 COMMUNICATION LINE
170 FLUID FLOW PATH ADJUSTMENT DEVICE
171 FLUID STOPPER DEVICE

The invention claimed is:

1. A liquid quality management device capable of being added to a liquid supply system, the liquid supply system supplying a liquid within a storage container to a dispensing device through a supply pipe with the liquid pressurized in order to cool the liquid in the dispensing device, and dispensing the cooled liquid to a drinking container from the dispensing device, the liquid quality management device comprising:
an actual flow rate preparation unit including a flow rate sensor which detects the amount of liquid dispensed into the drinking container, and configured to determine an actual measured flow rate of the liquid dispensed into the drinking container from the dispensing device;
a dispensing liquid temperature sensor configured to measure a temperature of the liquid dispensed into the drinking container; and
a determination unit electrically connected to the actual flow rate preparation unit and the dispensing liquid temperature sensor, the determination unit being configured to integrate the amount of the liquid dispensed into the drinking container during a period in which the measured liquid temperature is equal to or higher than a set temperature so as to determine an integrated flow rate of the liquid dispensed into the drinking container, and to determine whether or not coolability of the dispensing device is suitable by comparing the integrated flow rate with a determination value.

2. The liquid quality management device according to claim 1,
wherein the determination unit includes a total value preparation unit configured to add the flow rates of the liquid with a temperature lower than the set temperature in a set period, and to determine whether or not the coolability of the dispensing device is suitable by comparing an obtained total value with a predetermined value in a state that the integrated flow rate is equal to or lower than the determination value.

3. The liquid quality management device according to claim 1, further comprising:
a warning unit electrically connected to the determination unit and configured to generate warning information in a state it is determined that the coolability is insufficient.

4. The liquid quality management device according to claim 1, further comprising:
a transmission and reception unit electrically connected to the determination unit and configured to transmit information regarding whether or not the coolability is suitable to a communication line.

5. The liquid quality management device according to claim 1, further comprising:
a transmission and reception unit electrically connected to the determination unit,
wherein the determination unit includes a value-added information preparation unit configured to prepare value-added warning information by adding month, day, hour, and minute in time information into information on the determination that the coolability is insufficient, and the transmission and reception unit is configured to transmit the value-added warning information to a communication line.

6. The liquid quality management device according to claim 1, further comprising:
a fluid flow path adjustment device mounted with respect to the supply pipe, and including a fluid stopper device configured to stop the dispensing of the liquid from the dispensing device.

7. The liquid quality management device according to claim 1,
wherein the determination unit includes a determination value change unit configured to determine a flow velocity of the liquid from the amount of liquid per unit time, and change the determination value according to the obtained flow velocity.

8. The liquid quality management device according to claim 1,
wherein the flow rate sensor is installed between a liquid cooling pipe and a liquid dispensing outlet in the dispensing device.

\* \* \* \* \*